United States Patent
Trotman

(10) Patent No.: US 6,632,038 B2
(45) Date of Patent: Oct. 14, 2003

(54) KEYBOARD ARRANGEMENT FOR EASY ACQUISITION OF TYPING SKILLS

(76) Inventor: Douglas Trotman, 22151 Elbow Lake Rd., Yelm, WA (US) 98597

( * ) Notice: Subject to any disclaimer, the term of this patent is extended or adjusted under 35 U.S.C. 154(b) by 0 days.

(21) Appl. No.: 10/027,953

(22) Filed: Dec. 19, 2001

(65) Prior Publication Data

US 2003/0143009 A1 Jul. 31, 2003

(51) Int. Cl.[7] .................................................. B41J 5/08
(52) U.S. Cl. ....................... 400/489; 400/485; 400/486; 400/484; 400/487
(58) Field of Search ................................ 400/489, 485, 400/486, 484, 472, 100, 473, 487, 479; 345/168; 341/22, 20

(56) References Cited

U.S. PATENT DOCUMENTS

| | | | |
|---|---|---|---|
| 2,040,248 A | 5/1936 | Dvorak et al. | |
| 3,022,878 A * | 2/1962 | Seibel | 400/479 |
| 3,428,747 A * | 2/1969 | Alferieff | 178/17 R |
| 3,705,424 A | 12/1972 | Harvey, Jr. | |
| 3,950,634 A * | 4/1976 | Speiser | 235/145 R |
| 4,265,557 A * | 5/1981 | Runge | 400/479 |
| 4,378,553 A * | 3/1983 | McCall | 341/21 |
| 4,509,873 A * | 4/1985 | Ryan | 400/489 |
| 4,517,660 A * | 5/1985 | Fushimoto et al. | 361/681 |
| 4,584,443 A | 4/1986 | Yaeger | |
| 4,739,451 A * | 4/1988 | Kuba | 361/680 |
| 4,769,516 A | 9/1988 | Allen | |
| 4,849,732 A * | 7/1989 | Dolenc | 341/20 |
| 4,902,231 A * | 2/1990 | Freer | 434/227 |
| 4,913,573 A | 4/1990 | Retter | |
| 4,940,346 A * | 7/1990 | Liljenquist | 400/487 |
| 4,963,044 A * | 10/1990 | Warner | 400/486 |
| 5,067,834 A * | 11/1991 | Szmanda et al. | 400/489 |
| 5,073,050 A * | 12/1991 | Andrews | 400/82 |
| 5,137,384 A * | 8/1992 | Spencer et al. | 400/489 |
| 5,228,791 A * | 7/1993 | Fort | 400/489 |
| 5,251,106 A * | 10/1993 | Hui | 361/744 |
| 5,336,002 A * | 8/1994 | Russo | 400/489 |
| 5,410,333 A * | 4/1995 | Conway | 345/169 |
| 5,424,728 A * | 6/1995 | Goldstein | 341/22 |
| 5,457,453 A * | 10/1995 | Chiu et al. | 341/22 |
| 5,486,058 A | 1/1996 | Allen | |
| 5,498,088 A | 3/1996 | Choate | |
| 5,519,569 A * | 5/1996 | Sellers | 361/680 |
| 5,616,897 A * | 4/1997 | Weber et al. | 200/5 A |
| 5,852,414 A * | 12/1998 | Yu et al. | 341/22 |
| 5,865,546 A * | 2/1999 | Ganthier et al. | 400/489 |
| 5,993,089 A * | 11/1999 | Burrell, IV | 400/100 |
| 6,053,647 A | 4/2000 | Parkinson | |
| 6,084,576 A | 7/2000 | Leu et al. | |
| 6,266,234 B1 | 7/2001 | Leman | |

* cited by examiner

Primary Examiner—Daniel J. Colilla
Assistant Examiner—Wasseem H. Hamdan
(74) Attorney, Agent, or Firm—Brian J. Coyne

(57) ABSTRACT

A keyboard arrangement that assigns alphanumeric and special character symbols to keys based upon the shapes of the symbols in order to facilitate learning to type. Attribute classes are defined according to the number, position, direction, or contours of the line segments that comprise the symbols. As an aid to memorization of a keyboard arrangement, symbols are assigned to keys such that a substantial number of keys in a column of keys belong to the same attribute class. To convert any prior art or other kind of electronic keyboard to a keyboard arrangement within the scope of the invention, hardware and/or software components are provided that reassign the keys so that substantially all keys within the same column will correspond to symbols within the same attribute class. The scope of the invention includes keyboard arrangements that dispense with keys entirely and substitute therefor devices that are each capable of coding for as many symbols as two or more conventional keyboard keys; each of the devices is made to correspond to symbols within the same attribute class.

1 Claim, 8 Drawing Sheets

KEYBOARD ARRANGEMENT FOR EASY ACQUISITION OF TYPING SKILLS

CROSS REFERENCE TO RELATED APPLICATIONS

None.

STATEMENT REGARDING FEDERALLY APPROVED RESEARCH OR DEVELOPMENT

Not applicable.

BACKGROUND OF THE INVENTION

1. Field of the Invention

This invention relates to keyboards, and particularly to arrangements of keys on keyboards that facilitate easy and rapid acquisition of typing skills. This invention relates especially, but not exclusively, to electrical keyboards for encoding electrical signals representing alphanumeric and other readable characters, and to electrical keyboard arrangements that can be easily learned by novice typists.

2. Background Art

Personal computers are now so widely used that many persons who formerly had no need to learn to type find they must for computer data inputting, word processing, communicating via electronic mail, and internet browsing. With the rapid proliferation of personal computers in the workplace, the home, and schools, the ability to quickly and intuitively learn the key layout is critical. This proliferation has created many new, non-traditional keyboard users and has created a class of persons, those unable to master the predominant, QWERTY layout, who are at a substantial disadvantage in the burgeoning computer revolution. The "Universal" or "QWERTY" keyboard arrangement (FIG. 1) was originally adopted for typewriters in the 1870s by inventor C. L. Sholes and his colleagues in an attempt to reduce the frequency of jamming of type bars during typing—if two typebars were near each other, they would tend to clash into each other when typed in succession. To fix this, the most common letter pairs or digraphs in English usage, such as "TH" and "SH," were assigned to keys that were separated such that their type bars had sufficient time to fall back far enough to be out of the way before the next one came up. In adopting the QWERTY arrangement, little or no attention was paid to arranging the keys in ways that would make it easy to learn the keyboard. The QWERTY arrangement does not organize the individual keys in an intuitive, easy-to-remember manner, creating great difficulty in the memorization of the keyboard format. As a result, many users resort to highly inefficient typing methods, such as "hunt and peck" and "two-finger typing," that require the user to maintain eye contact with the keyboard to locate specific keys.

Another well known keyboard arrangement is the Dvorak system, which was designed to be easier to learn and use; see U.S. Pat. No. 2,040,248 to A. Dvorak; see also, R. C. Cassingham, *The Dvorak Keyboard* (Arcata, Calif.: Freelance Communications, 1986). The Dvorak style keyboard arrangement (FIG. 2) places the most common consonants on one side of the middle or home row and the vowels on the other side so that typing tends to alternate key strokes back and forth between the hands. Although in theory and by reputation, the Dvorak keyboard arrangement makes typing easier to learn (e.g., a typist can type about 400 of the English language's most common words without ever leaving the home row), recent scholarship indicates that these claims for it remain unproven, and they may even be a hoax. See S. Liebowitz and S. E. Margolis, "The Fable of the Keys," *J. Law & Econom.* 16: 1–25 (April 1990).

Other approaches to these problems can be found in U.S. Pat. Nos. 6,053,647, 6,084,576, 5,498,088, and 2,040,248. Each one of these suffers, however, from one or more of the following disadvantages:

1. The keyboard arrangement does not provide an intuitive easy-to-remember key location format;
2. The keyboard arrangement is designed to enhance typing speed, not to provide an intuitive, easy-to-remember key location format;
3. The keyboard arrangement is designed to aid and assist the expert typist rather than the novice; and
4. The keyboard arrangement does not rely on learnable skills that can be readily acquired by young and elderly users.

For the foregoing reasons, there is a need for a keyboard that overcomes the problems associated with the QWERTY and other prior art keyboard arrangements by assigning alphanumeric and other symbols to the keys in such a way as to provide an intuitive, easy-to-remember arrangement that facilitates efficient and effective keyboard use for all types of keyboard users. The present invention fulfills this need by grouping symbols according to the line elements comprising the symbols that all symbols within the group have in common, and by assigning symbols within the same group to logically grouped keys—for example, to keys within the same row or column. Japanese dictionaries commonly list characters according to the order and arrangement adopted by "Kohki-jitem" or "gyokuken," such that characters are classified and grouped in the order of the number of strokes and the kinds of strokes or radicals that comprise the characters; see P. M. Suski, *The Dictionary of Kan-Ji or Japanese Characters* (S. Pasadena, Calif.: P. D. & Ione Perkins, 1942), at 206. But, the present invention's grouping of symbols and assigning of the symbols to keys in a keyboard arrangement based on the line elements that comprise the symbols, in order to facilitate learning to type, appears to be wholly novel. Even though letter forms vary so widely that one might argue, as has Douglas R. Hostadter in *Metamagical Themas—Questing for the Essence of Mind and Pattern* (New York, N.Y.: Basic Books, 1985) at 274, that "the essence of A-ness is not geometrical," there is sufficient geometrical regularity in commonly used fonts and typefaces to usefully sort letters, numerals and special characters into "attribute classes" based upon their geometric forms.

SUMMARY OF THE INVENTION

In a first aspect of the invention, a keyboard arrangement is provided that comprises a plurality of manually actuable keys in a fixed array of at least three rows, sequentially numbered from a first, top row, to a last, bottom row, and at least nine columns, numbered sequentially from left to right. At least some of the keys correspond to letter, number, punctuation and special character symbols in a given language. Actuation of a key causes information corresponding to the symbols assigned to the key to be conveyed to information receiving means associated with the keyboard arrangement. One or more attribute classes is defined according to the number, position, direction, or contours of the lines that comprise the symbols. Keys are assigned to at least one of the attribute classes such that there are at least three keys in each column of at least nine columns that correspond to symbols within the same attribute class. Twenty-six attribute classes are defined for this first aspect of the invention, as follows:

(1) symbols having a top right oblique line and exemplified by K, k, W, w, X, x, V, v, Z, Z, /, %;
(2) symbols having a centrally-disposed, horizontal line and exemplified by A, E, F, H, +;
(3) symbols having a straight line intersected by a straight line extending leftwardly and exemplified by X, x, Z, z, y, T, A, H, 4, #, +;
(4) symbols having a left convex curve and exemplified by C, c, G, O, o, a, d, e, q, g, S, s, 6, 0, (, @, &;
(5) symbols having a partial or complete loop and exemplified by U, u, C, c, G, Q, o, O, @, %;
(6) symbols having a double curve and exemplified by S, s, B, m, g, 3, 8, $, &, ;
(7) symbols having a right convex curve and exemplified by B, b, D, P, p, R, S, s, O, o, 0, 2, 3, 9, 5, );
(8) symbols having a horizontal line and an intersecting, downward extending line, exemplified by T, t, Z, z, E, 4, 7, F, +, #;
(9) symbols having a single vertical line and exemplified by L, l, I, J, j, T, t, P, p, D, d, E, F, f, K, k, B, b, q, l, !, ¡;
(10) symbols having a top left oblique line and exemplified by K, k, W, w, M, N, V, x, \;
(11) symbols having a straight vertical line with a line projecting at a right angle and exemplified by E, F, H, T, f, t, +;
(12) symbols having a curve open at the bottom and exemplified by h, m, n;
(13) symbols having lines converging superiorly and exemplified by K, k, W, w, X, x, M, N, A, ^;
(14) symbols having lines converging inferiorly and exemplified by K, k, V, v, W, w, X, x, Y, y, M, N;
(15) symbols having lines converging to the left and exemplified by K, k, X, x, Z, z, <;
(16) symbols having lines converging to the right and exemplified by X, x, Z, z, 7, >;
(17) symbols having two, vertically-separated, horizontal lines and exemplified by Z, z, E, F, =, #;
(18) symbols having two, horizontally-separated, vertical lines and exemplified by H, h, M, m, N, n, U, u, #;
(19) symbols having a line and a closed loop at one end of said line, and exemplified by b, d, P, p, q, R, 6, 9;
(20) symbols having a closed loop on the top and exemplified by P, p, q, B, R, 9, 8, %, &;
(21) symbols having a closed loop on the bottom and exemplified by B, b, d, 6, 8, %, &;
(22) symbols having a closed loop on the left and exemplified by d, g, q, %, &;
(23) symbols having a closed loop on the right and exemplified by B, b, P, R, 6, %;
(24) symbols having a curved line constituting an incomplete loop and exemplified by C, c, G, j, m, n, U, u, 2, 3, 5, ?, (,);
(25) symbols having a line that projects below the line of writing, and exemplified by j, p, q, y; and
(26) symbols having a straight horizontal line exemplified by e, E, f, F, t, T, z, Z, 2, 4, 5, 7, -, _, A, F, H, L, #, B.

Thousands of fonts and typefaces have been developed over the years, examples of which are depicted in Lewis. Blackwell's *Twentieth Century Type* (Rizzoli International Publications, Inc., New York, N.Y., 1992) and in Jan Tischold's *Treasury of Alphabets and Lettering* (Omega Books Ltd., Herfordshire, U.K., 1985). Therefore, the term "exemplified by . . . ," as used herein and as applied to any set of alphabetic, numeric or special character symbols, shall be understood to be referring to all symbols that have the same meaning and use as said symbols, regardless of the particular font or typeface that is used to depict the symbols. Thus, for instance, the phrase "exemplified by d, g, q, %, &" refers to all font versions of lower case forms of the letters d, g, and q, and all font versions of the symbols % and &, including, for example, versions of those symbols within the Helvetica, Futura, Gothic, Italic, and any other fonts that contain recognizable versions of those symbols; also included within the phrase "exemplified by . . . " are versions of the listed symbols that are sans serif as well as versions of the listed symbols that include serifs.

In a second aspect of the invention, at least some of the keys correspond to a paired combination of an upper case symbol of a letter with a lower case symbol of the same letter, and the keyboard arrangement further comprises shift means for selecting between the upper and lower case symbol of said letter. In particular, for keyboard arrangements adapted for use with the Roman alphabet, the paired upper and lower case letter symbols are exemplified by A and a, B and b, C and c, D and d, E and e, F and f, G and g, H and h, I and i, J and j, K and k, L and l, M and m, N and n, O and o, P an p, Q and q, R and r, S and s, T and t, U and u, V and v, W and w, X and x, Y and y, Z and z.

In a third aspect of the invention, at least three keys in any one column correspond to symbols in the fourth attribute class, i.e., symbols that include a left convex curve, and at least three keys in any one other column correspond to symbols in the seventh attribute class, i.e., symbols that include a right convex curve.

In a fourth aspect of the invention, at least three keys in any one column correspond to symbols in the sixth attribute class, i.e., symbols that include a double curve.

In a fifth aspect of the invention, at least three keys in any one column correspond to symbols in the first attribute class, i.e., symbols having a top right oblique line.

In a sixth aspect of the invention, at least three keys in any one column correspond to symbols in the second attribute class, i.e., symbols having a centrally-disposed, horizontal line.

In a seventh aspect of the invention, at least three keys in any one column correspond to symbols in the third attribute class, i.e., symbols having a straight line intersected by a straight line extending leftwardly.

In an eighth aspect of the invention, at least three keys in any one column correspond to symbols in the fifth attribute class, i.e., symbols having a partial or complete loop.

In a ninth aspect of the invention, at least three keys in any one column correspond to symbols in the eighth attribute class, i.e., symbols having a horizontal line and an intersecting, downward extending line.

In a tenth aspect of the invention, at least three keys in any one column correspond to symbols in the ninth attribute class, i.e., symbols having a single vertical line.

In an eleventh aspect of the invention, at least three keys in any one column correspond to symbols in the tenth attribute class, i.e., symbols having a top left oblique line.

In a twelfth aspect of the invention, at least some of the keys correspond to an upper case symbol and a lower case symbol selected from the group of paired upper and lower case symbols comprising / and 2, - and 3, + and 4, ( and 6, % and 0, $ and 8, and 9, # and 7.

In a thirteenth aspect of the invention, the number of columns is ten and the keys in columns number 1 through 10 correspond to symbols in attribute classes 1 through 10, respectively.

In a fourteenth aspect of the invention, the keys in columns 1 through 10 in any one of the rows correspond to the paired upper and lower case symbols / and 2, − and 3, + and 4, (and 6, % and 0, $ and 8, ) and 9, # and 7, ! and 1, \ and 5, respectively.

In a fifteenth aspect of the invention, the keys in columns 1 through 10 in any one of the rows correspond to the paired upper and lower case symbols V and v, H and h, Y and y, C and c, U and u, S and s, D and d, T and t, I and i, N and n, respectively.

In a sixteenth aspect of the invention, the keys in columns 1 through 10 in any one of the rows correspond to paired upper and lower case symbols W and w, F and f, A and a, G and g, O and 0, B and b, P and p, Z and z, J and j, K and k, respectively.

In a seventeenth aspect of the invention, the keys in columns 1 through 10 in any of one of the rows correspond to paired upper and lower case symbols " and ', E and e, X and x, @ and ., Q and q, : and ;, R and r, ? and „ M and m, respectively.

In an eighteenth aspect of the invention, the keys in columns 1 through 10 in the first row correspond to paired upper and lower case symbols / and 2, − and 3, + and 4, (and 6, % and 0, $ and 8, ) and 9, # and 7, ! and 1, \ and 5, respectively; the keys in columns 1 through 10 in the second row correspond to paired upper and lower case symbols V and v, H and h, Y and y, C and c, U and u, S and s, D and d, T and t, I and i, N and n, respectively; the keys in columns 1 through 10 in the third row correspond to paired upper and lower case symbols W and w, F and f, A and a, G and g, O and 0, B and b, P and p, Z and z, J and j, K and k, respectively; and the keys in columns 1 through 10 in the fourth row correspond to paired upper and lower case symbols " and ', E and e, X and x, @ and ., Q and q, : and ;, R and r, ? and „ M and m, respectively.

In a nineteenth aspect of the invention, the attribute classes further include a twenty-sixth class of symbols having at least one curvilinear line and exemplified by C, c, G, g, U, u, S, s, B, b, D, d, P, p, R, r; and a twenty-seventh class of symbols having no curvilinear line and exemplified by V, v, W, w, H , F, E, Y, A, T, Z, I, i, L, l.

In a twentieth aspect of the invention, the keys that correspond to capital letter symbols in the twenty-sixth class are distributed substantially among four columns only.

In a twenty-first aspect of the invention, the keys that correspond to capital letter symbols in the twenty-sixth class are distributed substantially among four adjacent columns only.

In a twenty-second aspect of the invention, the keys that correspond to capital letter symbols in the twenty-seventh class are distributed substantially among at least five columns.

In a twenty-third aspect of the invention, the four columns are centrally disposed and said at least five columns are outlier columns disposed to the left and the right of said four columns.

In a twenty-fourth aspect of the invention, each one of at least some of the keys corresponds to a paired combination of an upper case letter symbol with a lower case symbol of the same letter, further comprising shift means for selecting between the upper and lower case of said letter symbol. These paired combinations may be exemplified by A and a, B and b, C and c, D and d, E and e, F and f, G and g, H and h, I and i, J and j, K and k, L and l, M and m, N and n, O and o, P an p, Q and q, R and r, S and s, T and t, U and u, V and v, W and w, X and x, Y and y, Z and z.

In a twenty-fifth aspect of the invention, a keyboard arrangement comprises a plurality of manually actuable keys in a fixed array of at least three rows, numbered sequentially from a first, top row, to a last, bottom row, and at least nine columns, numbered sequentially from left to right, at least some of which keys correspond to upper and lower case letter symbols, and at least some of which keys correspond to number, punctuation and special character symbols, in a given language; and shift means for selecting between the upper and lower case form of each letter symbol. Information corresponding to said symbols is to be conveyed to information receiving means associated with the keyboard arrangement. Each letter symbol is assigned either to a first, curved class if the symbol includes a curved line or to a second, noncurved class if the symbol lacks a curved line, and each column within a set of at least four columns has a key that corresponds to either an upper or lower case form of a letter symbol in the curved class and at least one other key that corresponds to an upper or lower case form of a letter symbol that is assigned to the curved class, and each column within a set of at least five columns has a key that corresponds to either an upper or lower case form of a letter symbol in the noncurved class and at least one other key that corresponds to an upper or lower case form of a letter symbol that is assigned to the noncurved class. The letter symbols assigned to the curved class may be exemplified by a, B, b, C, c, D, d, E, e, f, G, g, h, J, j, m, n, O, o, P, p, Q, q, R, r, S, s, U and u; and the letter symbols assigned to the noncurved class may be exemplified by A, F, H, I, K, k, L, l, M, N, T, t, V, V, W, w, X, x, Y, y, Z, z.

In a twenty-sixth aspect of the invention, in an arrangement that includes the immediately foregoing aspect of the invention, the keys that correspond to capital letter symbols in the twenty-sixth class are distributed among adjacent columns.

In a twenty-seventh aspect of the invention, in a keyboard arrangement that includes the immediately foregoing aspect of the invention, the capital letter symbols assigned to the curved class substantially all correspond to keys in four centrally-disposed columns, and the capital letter symbols assigned to the noncurved class substantially all correspond to keys in outlier columns.

In a twenty-eighth aspect of the invention, in a keyboard arrangement that includes the immediately foregoing aspect of the invention, each column that contains at least two keys that correspond to letter symbols in the curved class also contains at least one key that corresponds to a number symbol in the curved class.

In a twenty-ninth aspect of the invention, in a keyboard arrangement that includes the immediately foregoing aspect of the invention, the number symbols corresponding to keys in the four centrally-disposed columns all belong to the curved class. In a thirtieth aspect of the invention, in a keyboard arrangement that includes the twenty-seventh aspect of the invention, the letter symbols assigned to the noncurved class substantially all correspond to keys in the centrally-disposed columns, and the letter symbols assigned to the curved class substantially all correspond to keys in outlier columns.

In a thirty-first aspect of the invention, in a keyboard arrangement that includes the thirtieth aspect of the invention, the number symbols corresponding to keys in outlier columns all belong to the curved class.

In a thirty-second aspect of the invention, in a keyboard arrangement that includes any of the twenty-eighth through thirty-first aspects of the invention, the number symbols assigned to the curved class are exemplified by 2, 3, 5, 6, 8, 9, and 0.

In a thirty-third aspect of the invention, in a keyboard arrangement that includes the twenty-fifth aspect of the invention, all keys corresponding to letter symbols in any one column all correspond to the uppercase or lowercase form of a letter symbol that contains a left convex curve exemplified by a, c, C, d, e, g, o, O, Q, s, S, and all keys corresponding to letter symbols in any one other column correspond to the uppercase or lowercase form of a letter symbol that contains a right convex curve, exemplified by b, B, D, j, J, o, O, p, P, Q, R, s, S.

In a thirty-fourth aspect of the invention, in a keyboard arrangement that includes the twenty-fifth aspect of the invention, all keys corresponding to letter symbols in any one column all correspond to the upper or lowercase form of a letter symbol that contains a vertical, straight line exemplified by b, B, d, D, E, f, F, h, H, i, I, k, K, l, L, m, M, n, N, p, P, r, R, t, T, u, U, and all keys corresponding to letter symbols in any one other column all correspond to the upper or lowercase form of a letter symbol that contains a horizontal straight line exemplified by A, B, e, E, f, F, H, t, T.

In a thirty-fifth aspect of the invention, in a keyboard arrangement that includes the twenty-fifth aspect of the invention, all keys corresponding to letter symbols in any one column all correspond to the upper or lowercase form of a letter symbol that contains a top-left oblique line exemplified by k, K, w, W, M, N, v, V, x, and all keys corresponding to letter symbols in any one other column all correspond to the upper or lowercase form of a letter symbol that contains a top-right oblique line exemplified by k, K, w, W, x, X, V, V, z, Z.

In a thirty-sixth aspect of the invention, a keyboard arrangement comprises a plurality of manually actuable keys in a fixed array of at least three rows, numbered sequentially from a first, top row, to a last, bottom row, and at least nine columns, numbered sequentially from left to right, at least some of which keys correspond to upper and lower case letter symbols, and at least some of which keys correspond to number, punctuation and special character symbols, in a given language. Shift means is provided for selecting between the upper and lower case of each letter symbol. Information corresponding to said symbols is to be conveyed to information receiving means associated with the keyboard arrangement. Keys corresponding to letter symbols in a first column correspond to the upper or lowercase form of a letter symbol that contains a left convex curve exemplified by a, c, C, d, e, g, o, O, s, S, keys corresponding to letter symbols in a second column correspond to the uppercase or lowercase form a letter symbol that contains a right convex curve exemplified by b, B, D, o, O, p, P, Q, R, s, S, keys corresponding to letter symbols in a third column correspond to the uppercase or lowercase form of a letter symbol that contains a vertical, straight line exemplified by b, B, d, D, E, f, F, h, E, i, I, k, K, l, L, m, M, n, N, p, P, r, R, t, T, u, U, keys corresponding to letter symbols in a fourth column correspond to the uppercase or lowercase form of a letter symbol that contains a horizontal straight line exemplified by A, B, e, E, f, F, H, t, T, keys corresponding to letter symbols in a fifth column correspond to the uppercase or lowercase form of a letter symbol that contains a top-left oblique line exemplified by k, K, w, W, M, N, v, V, x, and keys corresponding to letter symbols in a sixth column correspond to the uppercase or lowercase form of a letter symbol that contains a top-right oblique line exemplified by k, K, w, W, x, X, v, V, z, Z. These correspondences may apply to all keys in a given column or to they may apply to substantially all keys in a given column.

In a thirty-seventh aspect of the invention, in a keyboard arrangement that includes the third aspect of the invention, a substantial number of the keys that correspond to numbers also correspond to punctuation or special character symbols such that said keys correspond to one or more pairs of symbols selected from the pairs 2 and /, 3 and −, 4 and +, 6 and (, 7 and #, 8 and $, 9 and ), 0 and %.

In a thirty-eighth aspect of the invention, in a keyboard arrangement that includes the thirty-sixth aspect of the invention, the keys that correspond to numbers and that also correspond to punctuation or special character symbols are all within the same row.

In a thirty-ninth aspect of the invention, a keyboard arrangement is provided that comprises a plurality of manually actuable keys in a fixed array of at least three rows, numbered sequentially from a first, top row, to a last, bottom row, and at least nine columns, numbered sequentially from left to right, at least some of which keys have been preassigned to correspond to a first set of upper and lower case letter, number, punctuation and special character symbols in a given language alphabet; shift means for selecting between the upper and lower case symbols; and computer hardware or software means for reassigning the preassigned keys to correspond to a second set of upper and lower case letter, number and special character symbols in the same or a different language alphabet. At least some of the second set of symbols that correspond to the keys are assigned to at least one of a plurality of attribute classes according to the number, position, direction and contours of the symbols. There are at least three keys in each of at least nine columns that correspond to symbols within the same attribute class. Information corresponding to said second set of symbols is to be conveyed to information receiving means associated with the keyboard arrangement. Preferably, the computer means for reassigning the preassigned keys comprises:

(a) an initializing component that initializes said software means;

(b) a keyboard hook installation component;

(c) a keystroke detection component that detects the stroking of a key that has been preassigned to a symbol within the first set of symbols;

(d) a keystroke trapping component that stores a first digital code for identifying said key;

(e) a reassignment component that reassigns said key to a symbol in the second set of symbols using a lookup table and dictionary combination that, for each key, maps a first digital code for said key that corresponds to a preassigned symbol within the first set of symbols into a second digital code that corresponds to a symbol within the second set of symbols;

(f) a keyboard buffer insertion component that inserts the second, reassigned digital code into a keyboard buffer that communicates with the information receiving means; and (g) a keyboard hook removal component that removes the keyboard hook when there are no additional keystrokes detected. The attribute classes can be any one or more of those set forth in the second aspect of the invention, supra.

In a fortieth aspect of the invention, in a keyboard arrangement that includes the third aspect of the invention, all keys that correspond to number symbols are within the same row and consecutively arranged in numerical order from left to right as 1, 2, 3, 4, 5, 6, 7, 8, 9, 0 in columns 1 through 10, respectively.

In a forty-first aspect of the invention, a keyboard arrangement is provided that comprises a plurality of manually actuable keying means in a fixed array. Each keying means can be manipulated into any one of at least three states by slight movement of a single finger of a typist. The three or more states of the keying means correspond to letter, number, punctuation and special character symbols in a given language. At least some of correspond to the keying means are assigned to at least one of a plurality of attribute classes according to the number, position, direction or contours of the lines within the symbols such that either (A) there are at least nine keying means, each keying means corresponding to at least three symbols within the same attribute class, wherein the attribute classes are any one or more of those set forth in the second aspect of the invention, supra; or (B) there are a curved class of symbols, each of said symbols having a curved line, and a noncurved class of symbols, each of said symbols lacking a curved line, such that there are at least four keying means that correspond to either an upper or lower case form of a letter symbol in the curved class and at least one other keying means that corresponds to an upper or lower case form of a letter symbol that is assigned to the curved class, and there are at least five keying means that corresponds to either an upper or lower case form of a letter symbol in the noncurved class and at least one other keying means that corresponds to an upper or lower case form of a letter symbol that is assigned to the noncurved class; or (C) a first keying means corresponds to the upper or lowercase form of a letter symbol that contains a left convex curve exemplified by a, c, C, d, e, g, o, O, s, S;
a second keying means corresponds to the uppercase or lowercase form of a letter symbol that contains a right convex curve exemplified by b, B, D, i, J, o, O, p, P, O, R, s, X;
a third keying means corresponds to the uppercase or lowercase form of a letter symbol that contains a vertical, straight line exemplified by b, B, d, D, E, f, F, h, E, i, I, k, K, l, L, m, M, n, N, p, P, r, R, t, T, u, U;
a fourth keying means corresponds to the uppercase or lowercase form of a letter symbol that contains a horizontal straight line exemplified by A, B, e, E, f, F, H, t, T;
a fifth keying means corresponds to the uppercase or lowercase form of a letter symbol that contains a top-left oblique line exemplified by k, K, w, W, M, N, v, V, x; and
a sixth keying means corresponds to the uppercase or lowercase form of a letter symbol that contains a top-right oblique line exemplified by k, K, w, W, x, X, v, V, z, Z.

It is an object of each aspect of the invention to provide a keyboard arrangement that is so easily understood, so intuitive, and so easily memorized, as to facilitate easy and rapid mastery of typing.

It is another object of the invention to provide computer means for converting any keyboard arrangement into any one or more of the above-listed aspects of the invention.

DETAILED DESCRIPTION OF THE PREFERRED EMBODIMENT

Figure 1:
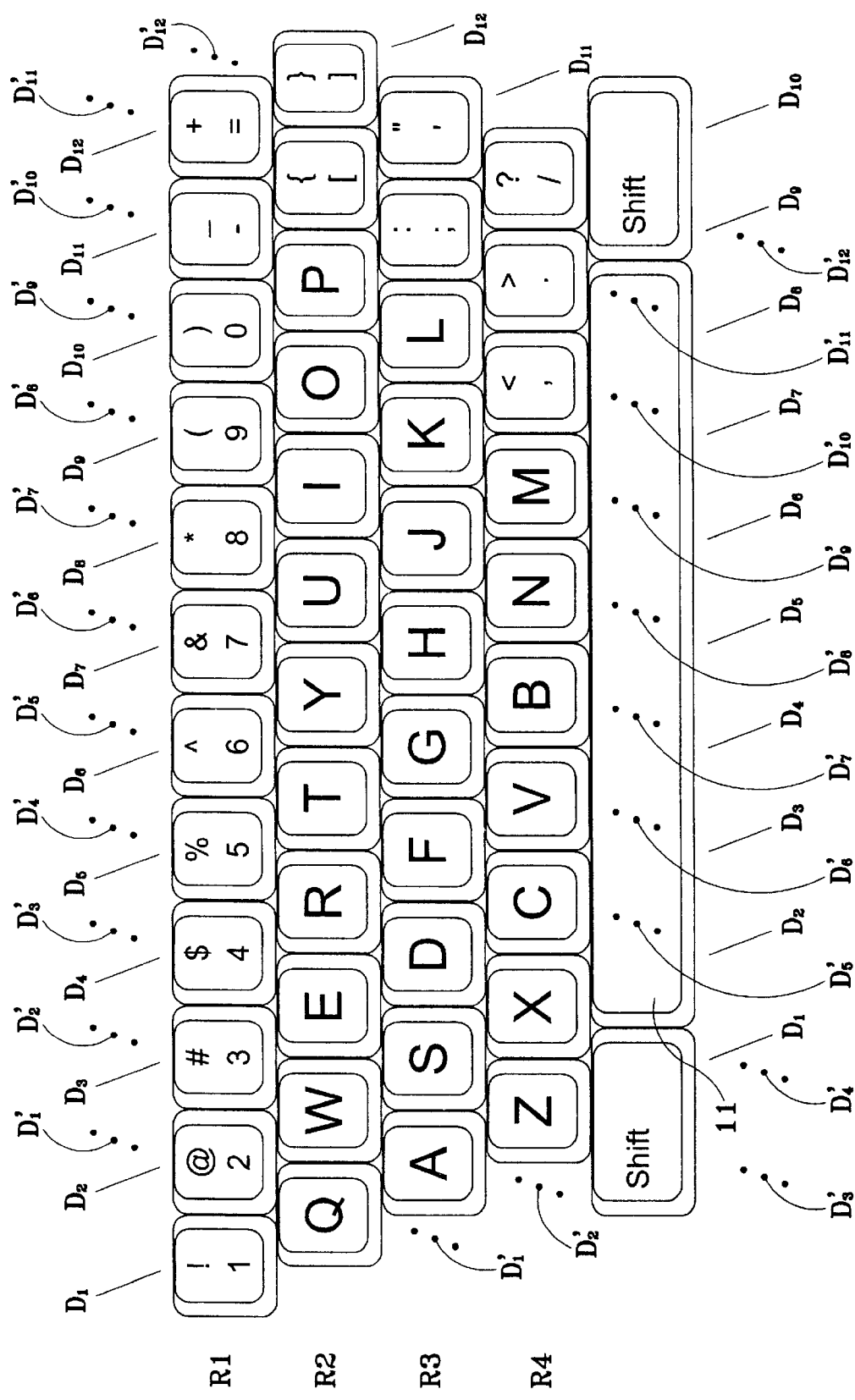
FIG. 1 depicts the QWERTY keyboard arrangement.

The QWERTY keyboard arrangement of the prior art is shown in FIG. 1, comprising four rows of keys, labeled $R_1$ to $R_4$ from top row to bottom row, respectively. Each row contains a plurality of keys, and the keys are disposed along diagonals $D_1$ through $D_{12}$. Each key bears indicia indicating the symbol(s) that correspond to the key. Shift means, including shift keys 12, are provided for selecting between upper case and lower case letter symbols (e.g., a and A, b and B, etc.), and for selecting between pairs of punctuation and other symbols (e.g., semicolon and colon, numeral 1 and exclamation point, etc.). For convenience, such diagonals $D_1$ through $D_{12}$ defined by the keys in the QWERTY and all subsequent keyboard arrangements discussed herein will be referred to, and depicted as, columns. Accordingly, the QWERTY keyboard arrangement in row-and-column format appears thus:

| ! | @ | # | $ | % | ^ | & | * | ( | ) | _ | + |
|---|---|---|---|---|---|---|---|---|---|---|---|
| 1 | 2 | 4 | 5 | 6 | 7 | 8 | 8 | 9 | 0 | - | = |
| Q | W | E | R | T | Y | U | I | O | P | { | } |
|   |   |   |   |   |   |   |   |   |   | [ | ] |
| A | S | D | F | G | H | J | K | L | : | " |   |
|   |   |   |   |   |   |   |   |   | ; | ' |   |
| Z | X | C | V | B | N | M | < | > | ? |   |   |
|   |   |   |   |   |   |   | , | . | / |   |   |

Figure 2:
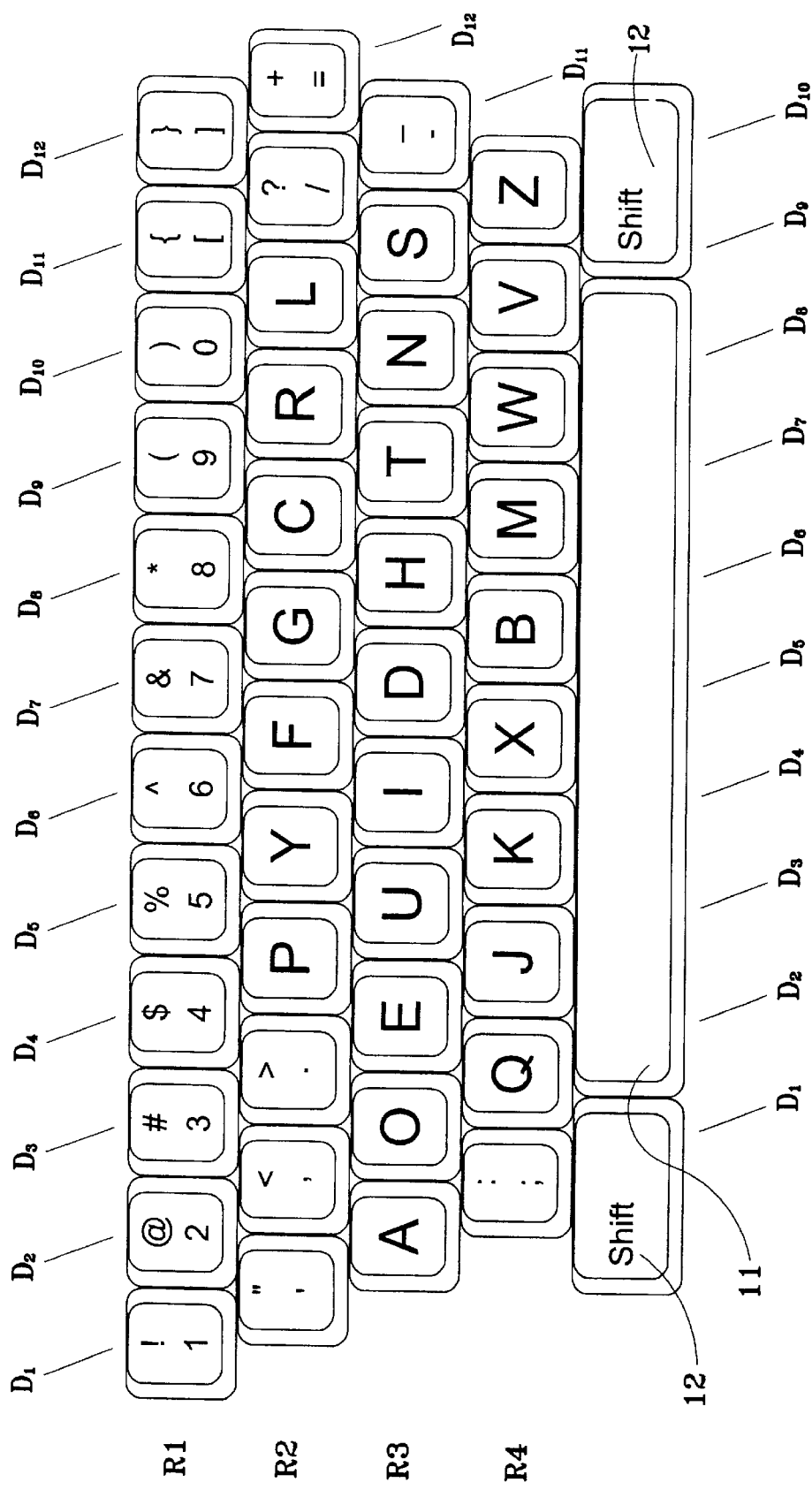
FIG. 2 depicts the DVORAK style keyboard arrangement.

Similarly, FIG. 2 depicts the Dvorak style keyboard arrangement, including four rows of keys R1 through R4 having keys disposed along diagonals $D_1$ through $D_{12}$. The Dvorak style keyboard arrangement in row-and-column format appears as follows:

| ! | @ | # | $ | % | ^ | & | * | ( | ) | { | } |
|---|---|---|---|---|---|---|---|---|---|---|---|
| 1 | 2 | 4 | 5 | 6 | 7 | 8 | 8 | 9 | 0 | [ | ] |
| " | < | > | P | Y | F | G | C | R | L | ? | + |
| ' | , | . |   |   |   |   |   |   |   | / | = |
| A | O | E | U | I | D | H | T | N | S | - |   |
| : | Q | J | K | X | B | M | W | V | Z |   |   |
| ; |   |   |   |   |   |   |   |   |   |   |   |

There can be variations within this style: for instance, this particular version differs from Dvorak's patented arrangement by placing the "Z" on the right side instead of on the left side. These and other prior art keyboard arrangements sometimes further included additional keys as, for example, a key for the tilda -- ---, selected by depressing the shift key, paired with an accent -- ---.

The present invention classifies alphabetical, numerical, punctuation and special character symbols in various ways according to the line elements that comprise the symbols. These classifications of symbols are referred to generically as attribute classes. By assigning symbols that are members of the same attribute class to keys in the same column, the task of learning to type is made easier and faster.

Figure 4:
FIG. 4 illustrates a first attribute class: a top right oblique line in the letter "K;"

A first attribute class is defined as the class of symbols having a top right oblique line. This class of symbols is exemplified by the symbols K, k, W, w, X, x, V, v, Z, z, / and %. FIG. 4, for example, denotes by the numeral 30 the top right oblique line in the letter "K".

Figure 5:
FIG. 5 illustrates a second attribute class: a centrally-disposed, horizontal line in the letter "H;"

A second attribute class is the class of symbols having a centrally-disposed, horizontal line, exemplified by A, E, F, H, +. FIG. 5, for example, denotes by the numeral 32 the centrally-disposed, horizontal line in the letter "H."

Figure 6:
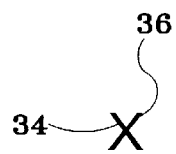
FIG. 6 illustrates a third attribute class: a straight line intersected by a straight line extending leftwardly in the letter

A third attribute class is the class of symbols having a straight line intersected by a straight line extending left-wardly and exemplified by X, x, Z, z, y, T, t, A, H, 4, #, and +. FIG. 6, for, example, denotes by the numerals 34, 36 such an intersection of two lines in the letter "X."

Figure 7:
FIG. 7 illustrates a fourth attribute class: a left, convex curve in the letter "S;"

A fourth attribute class is the class of symbols having a left convex curve and exemplified by C, C, G, O, o, a, d, e, q, g, S, s, 6, 0, (, @, and &. FIG. 7, for example, denotes by the numeral 38 a left convex curve in the letter. "S."

Figure 8A:
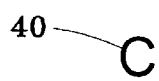
FIGS. 8A and 8B illustrate a fifth attribute class: a partial loop in the letter "C" in FIG. 8A and a complete loop in the letter "Q" in FIG. 8B.
Figure 8B:

A fifth attribute class is the class of symbols having a partial or complete loop and exemplified by U, u, C, c, G, Q, o, O, @ and %. FIG. 8A, for example, denotes by the numeral 40 a partial loop in the letter "C," and FIG. 8B denotes by the numeral 42 a complete loop in the letter "R."

Figure 9:
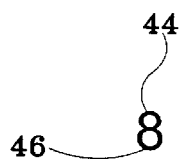
FIG. 9 illustrates a sixth attribute class: the double curve in the numeral "8;"

A sixth attribute class is the class of symbols having a double curve and exemplified by S, s, B, m, g, 3, 8, &, &, and . FIG. 9, for example, denotes by the numeral 44 a first curve and by the numeral 46 a second curve in the numeral "8."

Figure 10:
FIG. 10 illustrates a seventh attribute class: a right convex curve in the letter "P;"

A seventh attribute class is the class of symbols having a right convex curve and exemplified by B, b, D, P, p, R, S, s, O, o, ), 2, 3, 9, 5, and ). FIG. 10 for example, denotes by the numeral 48 such a curve in the letter "P."

Figure 11:
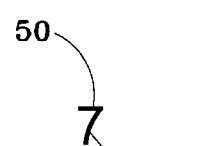
FIG. 11 illustrates an eighth attribute class: a horizontal line and an intersecting, downward extending line in the numeral "7;"

An eighth attribute class is the class of symbols having a horizontal line and an intersecting, downward extending line, exemplified by T, t, Z, z, E, 4, 7, F, +, and #. FIG. 11, for example, denotes by the numeral 50 a horizontal line and by the numeral 52 an intersecting downward extending line in the numeral "7."

Figure 12:
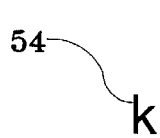
FIG. 12 illustrates a ninth attribute class: a single vertical line in the letter "k;"

A ninth attribute class is the class of symbols having a single vertical line, exemplified by L, 1, I, J,, j, T, t, P, p, D, d, E, F, f, K, k, B, b, q, 1, , ! and |. FIG. 12, for example, denotes by the numeral 54 a single vertical line in the letter "k."

Figure 13:
FIG. 13 illustrates a tenth attribute class: a top left oblique line in the letter "N;"

A tenth attribute class is the class of symbols having a top left oblique line, exemplified by K, k, W, w, M, N, V, x, and \. FIG. 13, for example, denotes by numeral 56 a top left oblique line in the letter "N."

Figure 14:
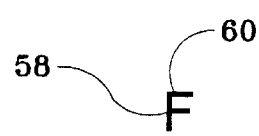
FIG. 14 illustrates an eleventh attribute class: a straight vertical line with a line projecting therefrom at a right angle in the letter "F;"

An eleventh attribute class is the class of symbols having a straight vertical line with a line projecting therefrom at a right angle, exemplified by E, F, H, T, f, t, and +. FIG. 14, for example, denotes by numeral 58 a straight vertical line and by numeral 60 a line projecting therefrom at a right angle in the letter "F."

Figure 15:
FIG. 15 illustrates a twelfth attribute class: a curve open at the bottom in the letter "h;"

A twelfth attribute class is the class of symbols having a curve open at the bottom, exemplified by h, m, and n. FIG. 15, for example, denotes by numeral 62 a curve open at the bottom in the letter "h."

Figure 16:
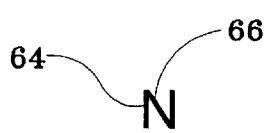
FIG. 16 illustrates a thirteenth attribute class: two lines converging superiorly in the letter "N;"

A thirteenth attribute class is the class of symbols having lines converging superiorly, exemplified by K, k, W, w, X, w, M, N, A, and ^. FIG. 16, for example, denotes by numerals 64 and 66 two lines converging superiorly in the letter "N."

Figure 17:
FIG. 17 illustrates a fourteenth attribute class: two lines converging inferiorly in the letter "N;"

A fourteenth attribute class is the class of symbols having lines converging inferiorly, exemplified by K, k, V, v, W, w, X, x, Y, y, M, and N. FIG. 17, for example, denotes by numerals 68 and 70 two lines converging inferiorly in the letter "N."

Figure 18:
FIG. 18 illustrates a fifteenth attribute class: two lines converging to the left in the letter "Z;"

A fifteenth attribute class is the class of symbols having lines converging to the left, exemplified by K, k, X, x, Z, z, and <. FIG. 18, for example, denotes by numerals 72 and 74 two lines converging to the left in the letter "Z."

Figure 19:
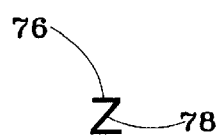
FIG. 19 illustrates a sixteenth attribute class: two lines converging to the right in the letter "Z;"

A sixteenth attribute class is the class of symbols having lines converging to the right, exemplified by X, x, Z, z, 7, and >. FIG. 19, for example, denotes by numerals 76 and 78 two lines converging to the right in the letter "Z."

Figure 20:
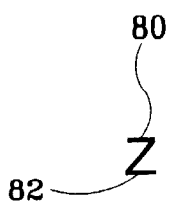
FIG. 20 illustrates a seventeenth attribute class: two, vertically-separated, horizontal lines in the letter "Z;"

A seventeenth attribute class is the class of symbols having two, vertically-separated, horizontal lines, exemplified by Z, z, E, F, =, and #. FIG. 20, for example, denotes by numerals 80 and 82 two, vertically-separated, horizontal lines in the letter "Z."

Figure 21:
FIG. 21 illustrates an eighteenth attribute class: two horizontally-separated, vertical lines in the letter "U;"

An eighteenth attribute class is the class of symbols having two, horizontally-separated, vertical lines, exemplified by H, h, M, m, n, U, u, and #. FIG. 21, for example, denotes by numerals 84 and 86 two, horizontally-separated, vertical lines in the letter "U."

Figure 22:
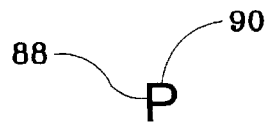
FIG. 22 illustrates a nineteenth attribute class: a line and a closed loop on end of said line in the letter "P;"

A nineteenth attribute class is the class of symbols having a line and a closed loop at one end of said line, exemplified by b, d, P, p, q, R, 6, and 9. FIG. 22, for example, denotes by numeral 88 a line and by 90 a closed loop at one end of line 88 in the letter "P."

Figure 23:
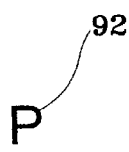
FIG. 23 illustrates a twentieth attribute class: a closed loop at the top of the letter "P;"

A twentieth attribute class is the class of symbols having a closed loop on the top, exemplified by P, p, q, B, R, 9, 8, %, and &. FIG. 23, for example, denotes by numeral 92 a closed loop on the top of the letter "P."

Figure 24:
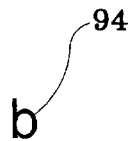
FIG. 24 illustrates a twenty-first attribute class: a closed loop at the bottom of the letter "b;"

A twenty-first attribute class is the class of symbols having a closed loop on the bottom, exemplified by B, b, d, 6, 8, %, and &. FIG. 24, for example, denotes by the numeral 94 a closed loop on the bottom of the letter "b."

Figure 25:
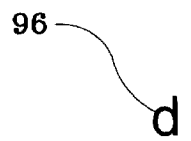
FIG. 25 illustrates a twenty-second attribute class: a closed loop on the left of the letter "d;"

A twenty-second attribute class is the class of symbols having a closed loop on the left, exemplified by d, g, G, q, % and &. FIG. 25, for example, denotes by the numeral 96 a closed loop on the left of the letter "d."

Figure 26:
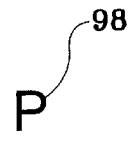
FIG. 26 illustrates a twenty-third attribute class: a closed loop on the right of the letter "P;"

A twenty-third attribute class is the class of symbols having a closed loop on the right, exemplified by B, b, P, R, 6, and %. FIG. 26, for example, denotes by the numeral 98 a closed loop on the right of the letter "P."

Figure 27:
FIG. 27 illustrates a twenty-fourth attribute class: a curved line constituting an incomplete loop in the numeral "5;"

A twenty-fourth attribute class is the class of symbols having a curved line constituting an incomplete loop, exemplified by C, c, G, j, m, n, U, u, 2, 3, 5, ?, (, and ). FIG. 27, for example, denotes by the numeral 100 an incomplete loop in the numeral "5."

Figure 28:
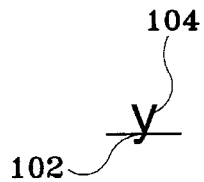
FIG. 28 illustrates a twenty-fifth attribute class: a line that projects below the line of writing in the letter "y;"

A twenty-fifth attribute class is the class of symbols having a line that projects below the line of writing, exemplified by j, p, q, and y. FIG. 28, for example, denotes by the numeral 102 the line of writing and denotes by the numeral 104 a line that projects below the line of writing 102 in the letter "y."

Figure 29:
FIG. 29 illustrates a twenty-sixth attribute class: a straight, horizontal line in the numeral "5;"

A twenty-sixth attribute class is the class of symbols having a straight horizontal line, exemplified by e, E, f, F, t, T, z, Z, 2, 4, 5, 7, , _, A, F, H, L, #, and B. FIG. 29, for example, denotes by the numeral 106 a straight, horizontal line in the numeral "5."

No one attribute class contains all the letter, punctuation and special character symbols one would wish to assign to the keys of a keyboard, so it will always be necessary to combine symbols from different attribute classes into a single keyboard arrangement. On the other hand, there is considerable overlap between the first through twenty-sixth attribute classes, as defined supra; that is, any one particular symbol can be a member of several different attribute classes. For instance, the letter "Z" is a member of the first, third, eighth, fifteenth, sixteenth, seventeenth, and twenty-sixth attribute classes, and the letter "N"is a member of the tenth, thirteenth and fourteenth attribute classes. To promote easy and rapid memorization of a keyboard arrangement, it is desirable to have all, or at least most, of the keys in any one column or row correspond to symbols within the same attribute class. Since there are typically at least three rows in each keyboard arrangement, this means, for example, that preferably at least three keys in any one column should correspond to symbols within the same attribute class. It is also desirable to combine attribute classes into a single keyboard arrangement in ways that minimize the overlaps in symbols between them; moreover, it is ordinarily desirable for the keyboard arrangement to include shift means for selecting between upper and lower case pairs of letters, punctuation and special character symbols, and to assign the upper case and lower case versions of the same letter to the same key. Utilizing these principles, a preferred embodiment of a keyboard arrangement according to the present invention, displayed in row-and-column format (i.e., four rows by 10 columns), is as follows:

FIRST ILLUSTRATED EMBODIMENT

| $R_1$ | / | – | + | ( | % | $ | ) | # | ! | \ |
|---|---|---|---|---|---|---|---|---|---|---|
|   | 2 | 3 | 4 | 6 | 0 | 8 | 9 | 7 | 1 | 5 |
| $R_2$ | V | H | Y | C | U | S | D | T | I | N |
| $R_3$ | W | F | A | G | O | B | P | Z | J | K |
| $R_4$ | " | E | X | @ | Q | : | R | ? | L | M |
|   | ' |   |   |   | . |   ; |   |   | , |   |

It will be understood, that only the upper case versions of the letters are displayed here, selectable by the shift means, and each key to which an upper case version of a letter has been assigned also has the lower case version of the same letter assigned to it. For instance, in the illustrated embodiment of the invention, the key at position row $R_3$ and column 3 will have assigned to it the following lower case and upper case letters: "a" and "A."Similarly, there are pairs of punctuation, numeric, and special character symbols assigned to keys. For example, the key at row $R_4$ and column 1 has assigned to it the apostrophe and the quotation mark (the latter selectable by the shift means). Assigned to the first column are symbols from the first attribute class (plus the apostrophe and quotation mark); assigned to the second column are symbols from the second (or twenty-sixth) attribute class; assigned to the third column are symbols from the third attribute class; assigned to the fourth column are symbols from the fourth attribute class (plus a period); assigned to the fifth column are symbols from the fifth attribute class; assigned to the sixth column are symbols from the sixth attribute class (plus a colon and semicolon); assigned to the seventh column are symbols from the seventh attribute class; assigned to the eighth column are symbols from the eighth attribute class (plus a comma and question mark); assigned to the ninth column are symbols from the ninth attribute class; and assigned to the tenth column are symbols from the tenth attribute class (plus the numeral 5). For ease of comparison with the QWERTY and Dvorak style keyboard arrangements, this first illustrated embodiment is depicted in diagonal format in FIG. 3. Certain keys 13 in columns 11 and 12 in the upper three rows in FIG. 3 bear no indicia. These keys are optional and could have assigned to them any of a variety of symbols, such as the following symbols: [,], ., {,} or .

Of course, the columns need not be in that particular order; any order will do—for instance, the reverse order of columns:

| SECOND ILLUSTRATED EMBODIMENT | | | | | | | | | |
|---|---|---|---|---|---|---|---|---|---|
| R1 | \ | ! | # | ) | $ | % | ( | + | − | / |
|    | 5 | 1 | 7 | 9 | 8 | 0 | 6 | 4 | 3 | 2 |
| R2 | N | I | T | D | S | U | C | Y | H | V |
| R3 | K | J | Z | P | B | O | G | A | F | W |
| R4 | M | L | ? | R | : | Q | @ | X | E | " |
|    |   | , |   |   | ; |   | . |   |   | ' |

Similarly, within the scope of the invention, the positions of the rows R1 through R4 can be interchanged; for instance, rows R2 and R4 could be interchanged to yield the following alternative embodiment:

| THIRD ILLUSTRATED EMBODIMENT | | | | | | | | | |
|---|---|---|---|---|---|---|---|---|---|
| $R_1$ | / | − | + | ( | % | $ | ) | # | ! | \ |
|       | 2 | 3 | 4 | 6 | 0 | 8 | 9 | 7 | 1 | 5 |
| R2    | " | E | X | @ | Q | : | R | ? | L | M |
|       | ' |   |   |   | . |   | ; |   | , |   |
| $R_3$ | W | F | A | G | O | B | P | Z | J | K |
| $R_4$ | V | H | Y | C | U | S | D | T | I | N |

Likewise, the symbols within any one column can be interchanged, such as by interchanging the position of E with that of H and by interchanging the position of K with that of M to yield the following alternative embodiment:

| FOURTH ILLUSTRATED EMBODIMENT | | | | | | | | | |
|---|---|---|---|---|---|---|---|---|---|
| $R_1$ | / | − | + | ( | % | $ | ) | # | ! | \ |
|       | 2 | 3 | 4 | 6 | 0 | 8 | 9 | 7 | 1 | 5 |
| $R_2$ | V | E | Y | C | U | S | D | T | I | N |
| $R_3$ | W | F | A | G | O | B | P | Z | J | M |
| $R_4$ | " | H | X | @ | Q | : | R | ? | L | K |
|       | ' |   |   |   | . |   | ; |   | , |   |

Nevertheless, the first illustrated embodiment is preferred to such alternatives because it captures within each column somewhat of an increasing complexity in the letter symbols as one progresses down each column from the first row to the fourth row; for example, in column 4, G is more complex than C; similarly, in column 7, P is more complex than D and R is more complex than P. This feature can aid one in learning any of the keyboard arrangements within the scope of the invention that incorporates it.

The above illustrated embodiments assign numeric symbols (1, 2, 3, 4, 5, 6, 7, 8, 9, 0) to keys within particular columns based upon their membership in a particular attribute class that has been associated with those particular columns. But, at least for some persons, it may facilitate learning a keyboard arrangement if the numeric symbols are assigned to columns in numeric order from left to right. The invention, therefore, includes those embodiments as well, such as the following keyboard arrangement:

| FIFTH ILLUSTRATED EMBODIMENT | | | | | | | | | |
|---|---|---|---|---|---|---|---|---|---|
| $R_1$ | / | − | + | ( | % | $ | ) | # | ! | \ |
|       | 1 | 2 | 3 | 4 | 5 | 6 | 7 | 8 | 9 | 0 |
| $R_2$ | V | H | Y | C | U | S | D | T | I | N |

-continued

| FIFTH ILLUSTRATED EMBODIMENT | | | | | | | | | |
|---|---|---|---|---|---|---|---|---|---|
| $R_3$ | W | F | A | G | O | B | P | Z | J | K |
| $R_4$ | " | E | X | @ | Q | : | R | ? | L | M |
|       | ' |   |   |   | . |   | ; |   | , |   |

Figure 30:
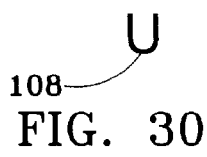
FIG. 30 illustrates a twenty-seventh attribute class: a curvilinear line segment in the letter "U;"

A twenty-seventh attribute class of symbols is defined as symbols having at least one curvilinear line, exemplified by C, c, G, g, U, u, S, s, B, b, D, d, P, p, R, and r. FIG. 30, for instance, denotes by the numeral 108 a curvilinear line segment in the letter "U." By way of further example, column 6 of the first illustrated embodiment is comprised substantially of symbols that are members of the twenty-seventh attribute class—namely, from top row to bottom row: $, 8, S, B, : and ;.

A twenty-eighth attribute class of symbols is defined as symbols having no curvilinear line and exemplified by V, v, W, w, H, F, E, Y, A, T, Z, I, i, L, \ and 1. By way of example, column 10 of the first illustrated embodiment is comprised substantially of symbols that are members of the twenty-eighth attribute class—namely, from top row to bottom row: \, N, K, M. A range of embodiments of the invention include those wherein the keys that correspond to capital letter symbols in the twenty-seventh attribute class are distributed substantially among at least four columns only, and, within said range of embodiments, those keyboard arrangements wherein the keys that correspond to capital letter symbols in the twenty-eighth attribute class are distributed substantially among five columns. Among such keyboard arrangements, for instance, are those in which the four columns that contain symbols in the twenty-seventh class are centrally disposed and the keys that contain symbols in the twenty-eighth class are in outlier columns disposed to the left and to the right of the four central columns. By way of example, the following keyboard arrangement meets these criteria in that the four central columns (columns 4–7) have keys to which are assigned symbols of the twenty-seventh class, and outlier columns (columns 1–3 and 8–10) have keys to which are assigned symbols of the twenty-eighth class (this example just happens to be identical to the first illustrated embodiment):

| SIXTH ILLUSTRATED EMBODIMENT | | | | | | | | | |
|---|---|---|---|---|---|---|---|---|---|
| $R_1$ | / | − | + | ( | % | $ | ) | # | ! | \ |
|       | 2 | 3 | 4 | 6 | 0 | 8 | 9 | 7 | 1 | 5 |
| $R_2$ | V | H | Y | C | U | S | D | T | I | N |
| $R_3$ | W | F | A | G | O | B | P | Z | J | K |
| $R_4$ | " | E | X | @ | Q | : | R | ? | L | M |
|       | ' |   |   |   | . |   | ; |   | , |   |

In the sixth illustrated embodiment, numeric symbols are shown assigned to keys in outlier columns that include curvilinear line segments, such as the numerals 2, 3, and 5, which is inconsistent with the classification scheme. This cannot be helped because all the numeric symbols except "1" and "4" include curvilinear line segments. In general, to facilitate learning a keyboard arrangement, the invention only requires that each column that contains at least two keys that correspond to letter symbols in the curved class (attribute class 27) also contains at least one key that corresponds to a number symbol in the curved class. For this purpose, the following numerals are assigned to the curved class: "2," "3," "5," "6," "8," "9;" and the following numerals are assigned to the noncurved class: "1" and "4."

The invention further includes the reverse situation—that is, keyboard arrangements wherein the central columns have keys that correspond to upper case letter symbols in the twenty-eighth attribute class, and outlier columns have keys that correspond to upper case letter symbols in the twenty-seventh attribute class, such as the following arrangement:

SEVENTH ILLUSTRATED EMBODIMENT

| | | | | | | | | | | |
|---|---|---|---|---|---|---|---|---|---|---|
| $R_1$ | ( | % | / | - | + | # | ! | \ | $ | ) |
| | 6 | 0 | 2 | 3 | 4 | 7 | 1 | 5 | 8 | 9 |
| $R_2$ | C | U | V | H | Y | T | I | N | S | D |
| $R_3$ | G | O | W | F | A | Z | J | K | B | P |
| $R_4$ | @ | Q | " | E | X | ? | L | M | : | R |
| | . | | ' | | | , | | | ; | |

It may be noted that, in the seventh illustrated embodiment, numeric symbols in the curved class have been assigned to keys in outlier columns, consistent with the assignment of letter symbols in the curved class to the outlier columns.

The assignment of letter symbols from an attribute class need not be based solely upon reference to attribute classes that contain upper case forms of letters: assignments may be based on lower case forms of letters as well. Thus, the scope of the invention includes keyboard arrangements in which all keys corresponding to letter symbols in any one column all correspond to the uppercase or lowercase form of a letter symbol that contains a left convex curve, exemplified by a, c, C, d, e, g, o, O, Q, s, S, and all keys corresponding to letter symbols in any one other column correspond to the uppercase or lowercase form of a letter symbol that contains a right convex curve, exemplified by b, B, D, o, O, p, P, Q, R, s, S. These will include keyboard arrangements of the following form, wherein the asterisks indicate that any one of several different symbols could be made to correspond to a key at the indicated location:

EIGHTH ILLUSTRATED EMBODIMENT

| | | | | | | | | | | |
|---|---|---|---|---|---|---|---|---|---|---|
| $R_1$ | * | * | * | ( | * | $ | * | * | * | * |
| | * | * | * | 6 | * | 9 | * | * | * | * |
| $R_2$ | * | * | * | 8 | * | D | * | * | * | * |
| $R_3$ | * | * | * | G | * | P | * | * | * | * |
| $R_4$ | * | * | * | Q | * | R | * | * | * | * |

It will be understood that, although the fourth column is shown in the eighth illustrated embodiment as having keys that correspond to symbols having a left convex curve and the sixth column is shown as having keys that correspond to symbols having a right convex curve, those symbols could instead be assigned to keys in any two columns of the ten columns illustrated.

In still another variation on keyboard arrangements that classifies symbols according to whether they include a left convex curve or a right convex curve, all keys corresponding to letter symbols in any one column all correspond to the uppercase or lowercase form of a letter symbol that contains a left convex curve, exemplified by a, c, C, d, e, g, o, O, Q, s, and all keys corresponding to letter symbols in any one other column correspond to the uppercase or lowercase form of a letter symbol that contains a right convex curve, exemplified by b, B, D, o, O, p, P, Q, R, s, S. Such keyboard arrangements include, for example, the following:

NINTH ILLUSTRATED EMBODIMENT

| | | | | | | | | | | |
|---|---|---|---|---|---|---|---|---|---|---|
| $R_1$ | / | - | + | ( | % | $ | ) | # | ! | \ |
| | 2 | 3 | 4 | 6 | 0 | 8 | 9 | 7 | 1 | 5 |
| $R_2$ | V | H | Y | C | U | S | D | T | I | N |
| $R_3$ | W | F | A | G | O | B | P | Z | J | K |
| $R_4$ | " | @ | X | E | Q | : | R | ? | L | M |
| | ' | . | | | | ; | | | , | |

The ninth illustrated embodiment is just the seventh illustrated embodiment, except that "E" and "@" (together with the period) have switched positions, which switch is permitted because lower case "e" is a member of the class of symbols that include a left convex curve—consistent with the other symbols assigned to keys in column 4.

Letter symbols may be sorted into attribute classes according to whether they include, on the one hand, a vertical, straight line, exemplified by b, B, d, D, E, f, F, h, H, i, I, k, K, l, L, M, n, N, p, P, r, R, t, T, u, and U, and, on the other hand, whether they contain a horizontal, straight line, exemplified by A, b, e, E, f, F, H, t, and T. An example of a keyboard arrangement wherein all keys corresponding to letter symbols in any one column all correspond to the upper or lower case form of a letter symbol that contains a vertical straight line, and all keys corresponding to letter symbols in any one other column all correspond to the upper or lowercase form of a letter symbol that contains a horizontal straight line, is the following:

TENTH ILLUSTRATED EMBODIMENT

| | | | | | | | | | | |
|---|---|---|---|---|---|---|---|---|---|---|
| $R_1$ | * | * | * | ( | * | $ | * | * | * | * |
| | * | * | * | I | * | A | * | * | * | * |
| $R_2$ | * | * | * | D | * | B | * | * | * | * |
| $R_3$ | * | * | * | E | * | H | * | * | * | * |
| $R_4$ | * | * | * | F | * | T | * | * | * | * |

(asterisks indicate that any one of several different symbols could be made to correspond to a key at the indicated location).

Letter symbols may also be sorted into attribute classes according to whether they include a top-left oblique line (class 10), and according to whether they contain a top-right oblique line (class 1). An example of a keyboard arrangement wherein all keys corresponding to letter symbols in any one column all correspond to the upper or lowercase form of a letter symbol that contains a top-left oblique line, and all keys corresponding to letter symbols in any one other column all correspond to the upper or lowercase form of a letter symbol that contains a top-right oblique line, is the following:

ELEVENTH ILLUSTRATED EMBODIMENT

| | | | | | | | | | | |
|---|---|---|---|---|---|---|---|---|---|---|
| $R_1$ | * | * | * | / | * | \ | * | * | * | * |
| | | | | 2 | | 5 | | | | |
| $R_2$ | * | * | * | W | * | N | * | * | * | * |
| $R_3$ | * | * | * | V | * | K | * | * | * | * |
| $R_4$ | * | * | * | " | * | M | * | * | * | * |
| | | | | ' | | | | | | |

Figure 31:
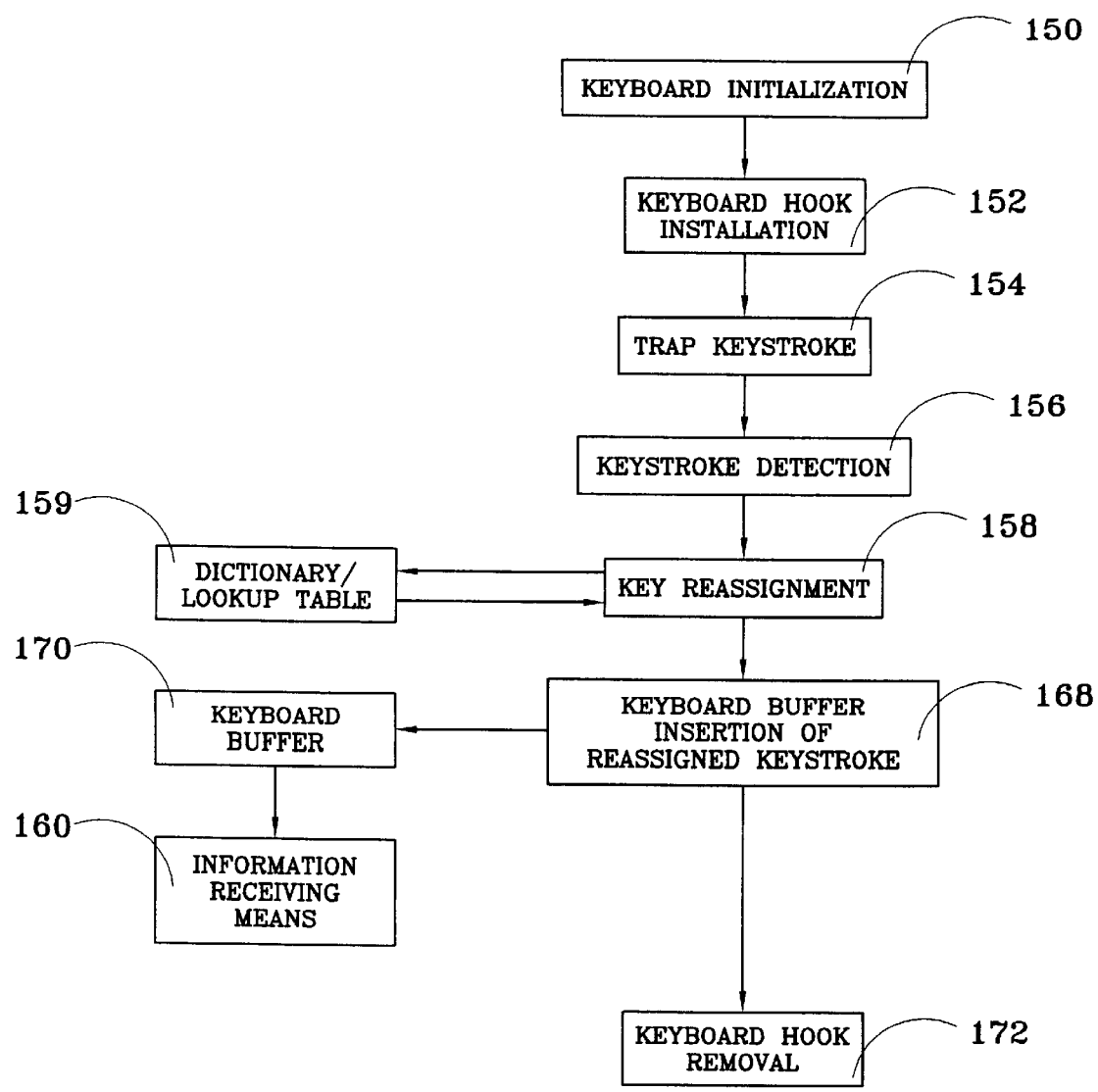
FIG. 31 is a block diagram of computer means for converting a prior art electronic keyboard arrangement to a keyboard arrangement of the present invention.

Each of the foregoing keyboard arrangements may be incorporated into any device that includes an alphanumeric keyboard, such as a manual, electric or electronic typewriter, an electronic keyboard with a plurality of separate, manually-depressible keys for inputting symbols and data into a digital computer, a membrane keyboard, and any of a variety of ergonomic keyboards (see, e.g., U.S. Pat. No. 6,266,234 to M. Leman). Referring now to FIG. 31, in another embodiment the invention further includes computer means for converting any prior art or other kind of electronic keyboard, such as Qwerty or Dvorak, into any of the foregoing keyboard arrangements described herein that classify symbols into attribute classes based upon the kinds of line segments that are included within the symbols. Such computer means may be computer software, computer hardware, or a combination thereof. In a preferred embodiment, the computer means reassigns keys, which keys have been preassigned to a first set of symbols within some initial, prior art keyboard arrangement, in order to convert the initial keyboard arrangement to one of the above-described new keyboard arrangements, wherein, in the new arrangement, the keys are reassigned to correspond to a second set of symbols. Associated with the initial keyboard arrangement is a first program that assigns specific symbols to specific keys such that, when a key is depressed, a digital code is transmitted to an information receiving means, which digital code represents a symbol that is assigned to said key. The computer means comprises the following components:

(a) an initializing component 150 that initializes said software means;

(b) a keyboard hook installation component 152, wherein a keyboard hook is defined as an entry point by means of which an external program can access a program (in this case, the first program) in order to enhance program capabilities;

(c) a keystroke detection component 154 that detects the stroking of a key that has been preassigned to a symbol within a first set of symbols;

(d) a keystroke trapping component 156 that stores a digital code for identifying said key;

(e) a key reassignment component 158 that reassigns said key to a symbol in the second set of symbols using a lookup table and dictionary combination 159 that, for each key, maps a first digital code for said key that corresponds to a preassigned symbol within the first set of symbols into a second digital code that corresponds to a symbol within the second set of symbols;

(f) a keyboard buffer insertion component 168 that inserts the second, reassigned digital code into a keyboard buffer 170 that communicates with an information receiving means 160; and (g) a keyboard hook removal component 172 that removes the keyboard hook when there are no additional keystrokes detected. The arrows in FIG. 30 indicate the direction of flow of signals between the components. Keyboard remappers of this kind are known to persons of ordinary skill in the art, and software versions can be purchased for use in a Microsoft Windows environment, for example, from Insight Software Solutions, Inc., of Kaysville, Utah. Using such computer means, a keyboard arrangement of the prior art can be converted to any of the keyboard arrangements described herein, and any preassigned keys that bear indicia according to the prior art arrangement can be covered over with key caps bearing indicia that correspond to the new keyboard arrangement.

Figure 3:
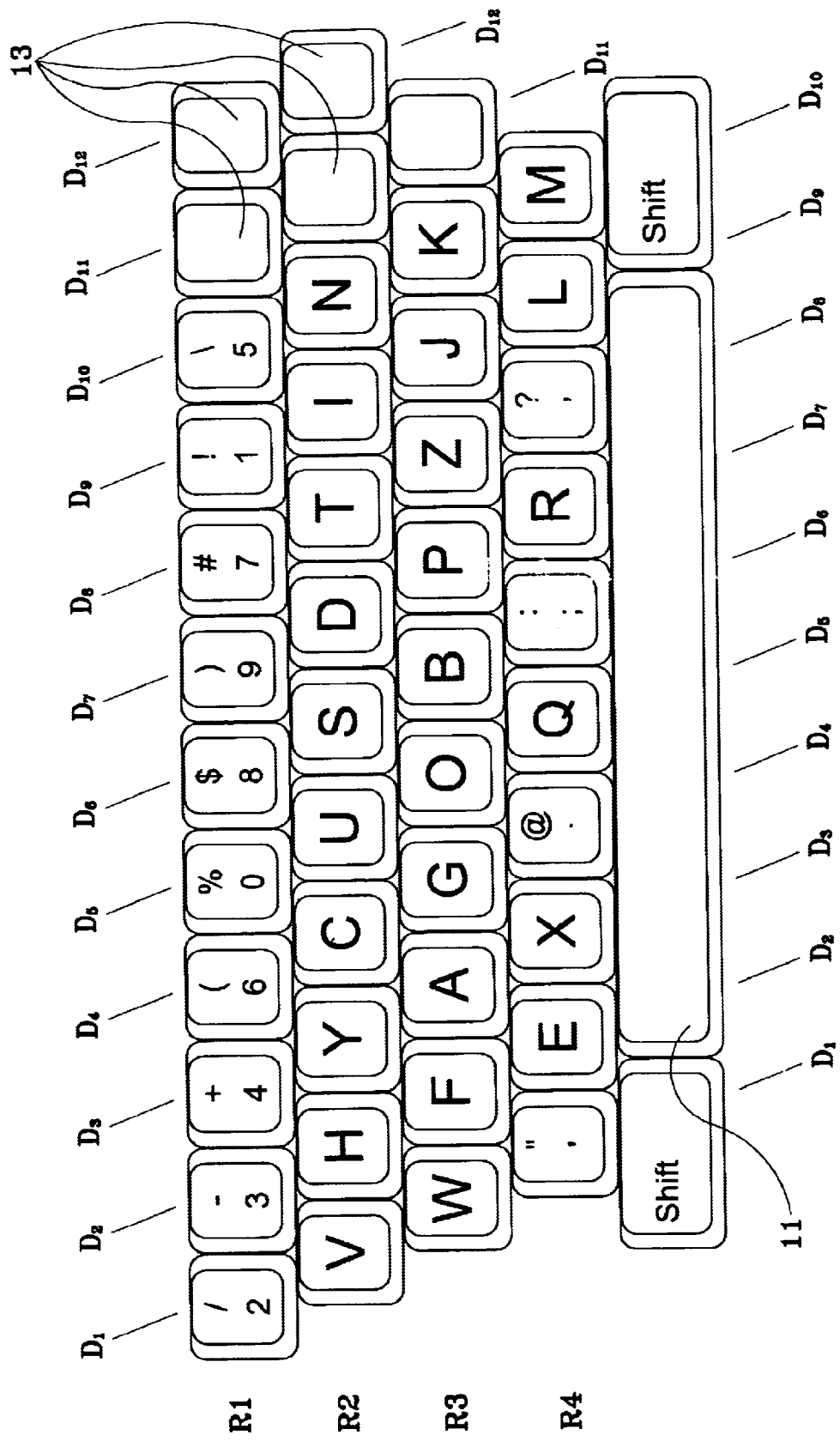
FIG. 3 depicts the first illustrated embodiment of the present invention in diagonal format.
Figure 32:
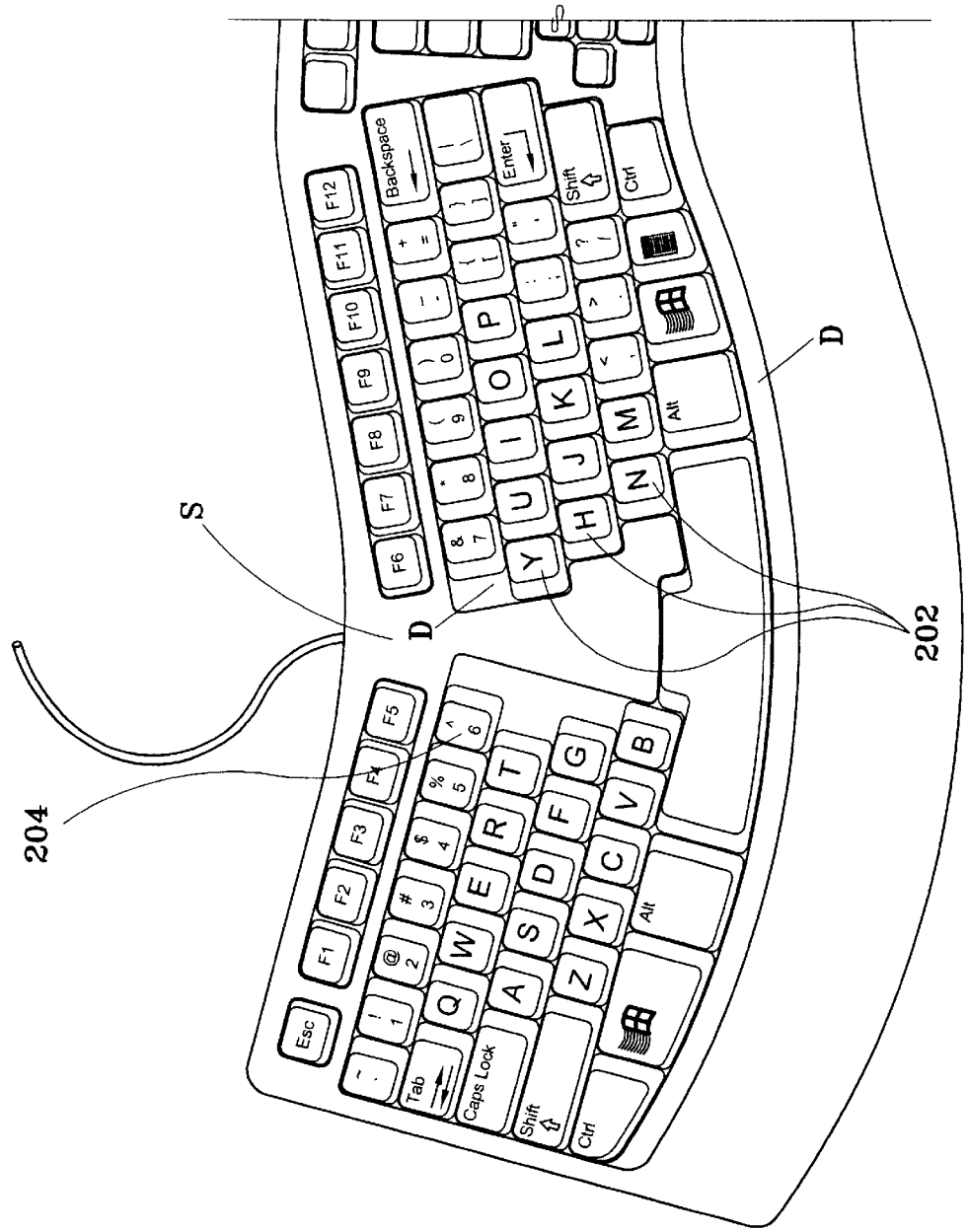
FIG. 32 is a sectional schematic view of the keying means of R. P. Harvey, Jr.
Figure 33:
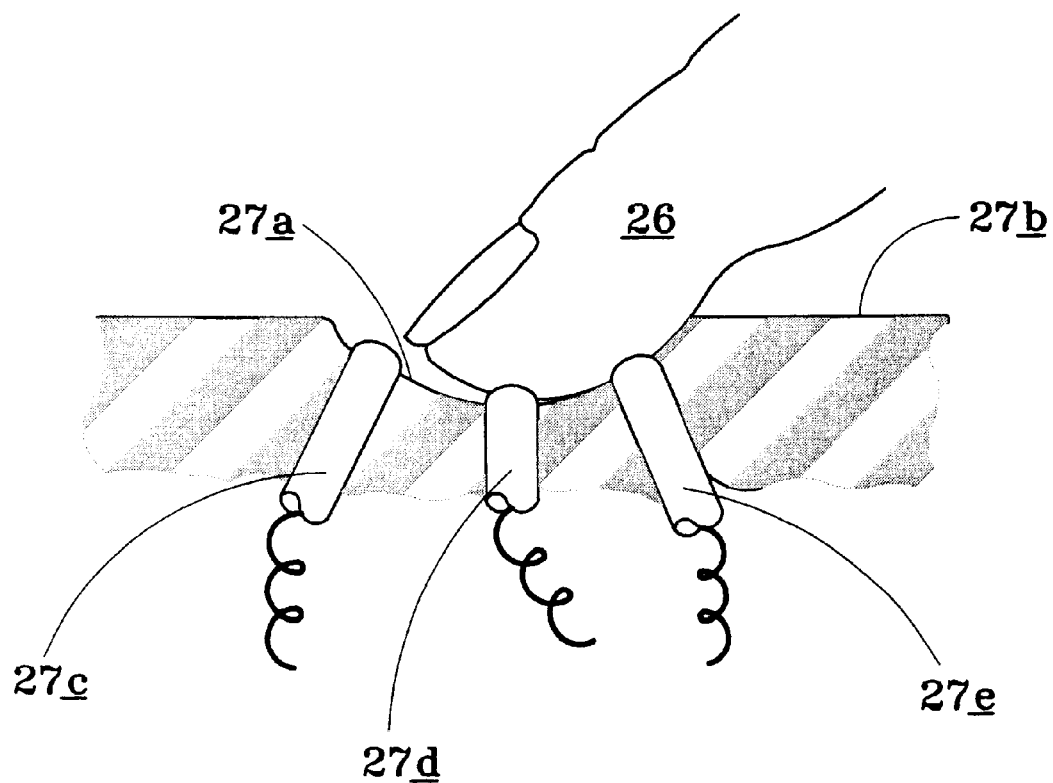
FIG. 33 is a top plan view of the Natural Keyboard Elite of Microsoft Corporation of Redmond, Wash., which is an ergonomic keyboard having three keys (Y, H, N) aligned along a diagonal D on the right side of split S, and one key bearing the indicia / and 6 on the upper left side of the split that is displaced from diagonal D but should, nevertheless, be considered to be in columnar alignment with said three keys.

It will be appreciated that various modifications can be made to the exact form of the present invention without departing from the scope thereof. The term "column" as used herein should be intepreted broadly enough to include, in a split or ergonomic keyboard such as depicted in FIG. 33, not only the disposition of keys 202 aligned along a diagonal D on one side of the split S, but also any keys 204 on the opposite side of the split S that would have been substantially aligned on the same diagonal D but for the split (i.e., in FIG. 33, the key 204 bearing the indicia / and 6). The term "column" as used herein is not limited to only a first set of diagonals ($D_1$, $D_2$, $D_3$, et cetera) as depicted in FIGS. 1–3; the term "column" applies equally well to the alignments of keys along a second set of diagonal lines that intersects the first set of diagonals; see, for example, the dotted lines $D_1'$, $D_2'$, $D_3'$, et cetera in FIG. 1. Moreover, the invention can even be incorporated into keyboards that lack columnar arrays of keys. For instance, instead of a keyboard arrangement comprising a set of manually-depressible keys arranged in columns and rows, wherein a designated symbol or pair of symbols is assigned to each key, a keyboard arrangement can include a plurality of keying means spaced apart in any convenient manner, wherein each keying means is adapted to distinguish between three or more motions of each of a typist's ten fingers so that each keying means can encode two or more symbols by being placed into one of three or more states. See, for example, the following disclosures of keying means, which by this reference are incorporated herein: the captive input device of Yaeger, U.S. Pat. No. 4,584,443; the continuous touch keyboard of Allen, U.S. Pat. No. 5,486,058; the finger operated switching apparatus of Allen, U.S. Pat. No. 4,769,516; the alphanumeric keyboard of Retter, U.S. Pat. No. 4,913,573; and the electrical switching apparatus utilizing conductivity of the human skin of R. P. Harvey, Jr., U.S. Pat. No. 3,705,424. Such devices can distinguish between forward extension, rearward retraction, and downward and sideways movements of individual fingers, thereby permitting a single keying means to do the job of several keys of a conventional keyboard. See, for example, FIG. 32, which depicts a keying means disclosed in the cited Harvey, Jr., patent, wherein a finger tip 26 within recess 27a is shown bridging electrical contacts 26d and 27e (state 1) in order to select a first symbol, but can be moved slightly to bridge contacts 27c and 27d in order to select a second symbol (state 2) or the finger can be lifted (state 3—off). These and similar keying means, each capable of doing the work of two or more conventional keyboard keys, can be incorporated into a keyboard arrangement according to the principles of the present invention set forth above, wherein any desired subset of the attribute classes defined by the invention may be used to create correspondences between the keying means and alphanumeric and special character symbols. Accordingly, it is intended that the disclosure be taken as illustrative only and not limiting in scope, and that the scope of the invention be defined by the following claims.

I claim:

1. A keyboard arrangement comprising:
 a plurality of manually actuable keying means in a fixed array, each keying means being capable of being placed into any of three or more states by slight movement of a single finger of a typist, and at least some of said states are selected electronically or by software selection means to correspond to symbols such as letters, numbers, punctuations and special characters in a given language;
 wherein information corresponding to said symbols is to be conveyed to information receiving means associated with the keyboard arrangement, and wherein at least some of the symbols that correspond to the keying means are assigned to at least one of a plurality of attribute classes according to the number, position, direction or contours of the lines within the symbols such that either (A) there are at least five keying means, each keying means corresponds to at least three symbols within the same attribute class, and wherein the attribute classes include a first class of symbols having a top right oblique line and exemplified by K, k, W, w, X, x, V, v, Z, z, /, %; a second class of symbols having a centrally-disposed, horizontal line and exemplified by A, E, F, H, +; a third class of symbols having a straight line intersected by a straight line extending leftwardly and exemplified by X, x, Z, z, y, T, t, A, H, 4, #, +; a fourth class of symbols having a left convex curve and exemplified by C, c, G, O, o, a, d, e, q, g, S, s, 6, 0, (, @, &; a fifth class of symbols having a partial or complete loop and exemplified by U, u, C, c, G, Q, o, O, @, %; a sixth class of symbols having a double curve and exemplified by S, s, B, m, g, 3, 8, $, &, ; a seventh class of symbols having a right convex curve and exemplified by B, b, D, P, p, R, S, s, O, o, 0, 2, 3, 9, 5, ); an eighth class of symbols having a horizontal line and an intersecting, downward extending line, exemplified by T, t, Z, z, E, 4, 7, F, +, #; a ninth class of symbols having a single vertical line and exemplified by L, l, I, J, j, T, t, P, p, D, d, E, F, f, K, k, B, b, q, l, !, |; and a tenth class of symbols having a top left oblique line and exemplified by K, k, W, w, M, N, V, x, \; a eleventh class of symbols having a straight vertical line with a line projecting at a right angle and exemplified by E, F, H, T, f, t, +; a twelfth class of symbols having a curve open at the bottom and exemplified by h, m, n; a thirteenth class of symbols having lines converging superiorly and exemplified by K, k, W, w, X, x, M, N, A, ^; a fourteenth class of symbols having lines converging inferiorly and exemplified by K, k, V, v, W, w, X, x, Y, y, M, N; a fifteenth class of symbols having lines converging to the left and exemplified by K, k, X, x, Z, z, <; a sixteenth class of symbols having lines converging to the right and exemplified by X, x, Z, z, 7, >; a seventeenth class of symbols having two, vertically-separated, horizontal lines and exemplified by Z, z, E, F, =, #; an eighteenth class of symbols having two, horizontally-separated, vertical lines and exemplified by H, h, M, m, N, n, U, u, #; a nineteenth class of symbols having a line and a closed loop at one end of said line, and exemplified by b, d, P, p, q, R, 6, 9; a twentieth class of symbols having a closed loop on the top and exemplified by P, p, q, B, R, 9, 8, %, &; a twenty-first class of symbols having a closed loop on the bottom and exemplified by B, b, d, 6, 8, %, &; a twenty-second class of symbols having a closed loop on the left and exemplified by d, g, G, q, %, &; a twenty-third class of symbols having a closed loop on the right and exemplified by B, b, P, R, 6, %; a twenty-fourth class of symbols having a curved line constituting an incomplete loop and exemplified by C, c, G, j, m, n, U, u, 2, 3, 5, ?, (,) a twenty-fifth class of symbols having a line that projects below the line of writing and exemplified by j, p, q, y; a twenty-sixth class of symbols having a straight horizontal line exemplified by e, E, f, F, t, T, z, Z, 2, 4, 5, 7, -, _, A, F, H, L, #, B; or (B) there are a curved class of symbols, each of said symbols having a curved line, and a noncurved class of symbols, each of said symbols lacking a curved line, such that each there are at least four keying means that correspond to either an upper or lower case form of a letter symbol in the curved class and at least one other keying means that corresponds to an upper or lower case form of a letter symbol that is assigned to the curved class, and there are at least five keying means that corresponds to either an upper or lower case form of a letter symbol in the noncurved class and at least one other keying means that corresponds to an upper or lower case form of a letter symbol that is assigned to the noncurved class; or (C) a first keying means corresponds to the upper or lowercase form of a letter symbol that contains a left convex curve exemplified by a, c, C, d, e, g, o, O, s, S;

a second keying means corresponds to the uppercase or lowercase form of a letter symbol that contains a right convex curve exemplified by b, B, D, i, J, o, O, p, P, O, R, s, X;

a third keying means corresponds to letter symbols in a third column all correspond to the uppercase or lowercase form of a letter symbol that contains a vertical, straight line exemplified by b, B, d, D, E, f, F, h, E, i, I, k, K, l, L, m, M, n, N, p, P, r, R, t, T, u, U;

a fourth keying means corresponds to the uppercase or lowercase form of a letter symbol that contains a horizontal straight line exemplified by A, B, e, E, f, F, H, t, T;

a fifth keying means corresponds to the uppercase or lowercase form of a letter symbol that contains a top-left oblique line exemplified by k, K, w, W, M, N, v, V, x; and a sixth keying means corresponds to the uppercase or lowercase form of a letter symbol that contains a top-right oblique line exemplified by k, K, w, W, x, X, v, V, z, Z.

* * * * *